US011025890B2

United States Patent
Choi et al.

(10) Patent No.: US 11,025,890 B2
(45) Date of Patent: Jun. 1, 2021

(54) ELECTRONIC DEVICE AND METHOD FOR ACQUIRING DEPTH INFORMATION BY USING AT LEAST ONE OF CAMERAS OR DEPTH SENSOR

(71) Applicant: Samsung Electronics Co., Ltd., Gyeonggi-do (KR)

(72) Inventors: Songha Choi, Gyeonggi-do (KR); Donghoon Kim, Gyeonggi-do (KR); Bongchan Kim, Gyeonggi-do (KR); Byeonghoon Park, Gyeonggi-do (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 16/697,295

(22) Filed: Nov. 27, 2019

(65) Prior Publication Data
US 2020/0177869 A1 Jun. 4, 2020

(30) Foreign Application Priority Data
Dec. 3, 2018 (KR) .......................... 10-2018-0153883

(51) Int. Cl.
*H04N 13/271* (2018.01)
*H04N 13/254* (2018.01)
(Continued)

(52) U.S. Cl.
CPC ........... *H04N 13/271* (2018.05); *G01S 17/89* (2013.01); *G06T 7/50* (2017.01); *H04N 13/239* (2018.05);
(Continued)

(58) Field of Classification Search
CPC .. H04N 13/271; H04N 13/254; H04N 13/239; G06T 7/50; G06T 2207/10028; G01S 17/89
(Continued)

(56) References Cited

U.S. PATENT DOCUMENTS 6,229,913 B1 * 5/2001 Nayar .................. G06K 9/2036
382/154
10,447,997 B2 10/2019 Sung et al.
(Continued)

FOREIGN PATENT DOCUMENTS

JP 2013-104784 A 5/2013
JP 2017-223648 A 12/2017
(Continued)

OTHER PUBLICATIONS

Wajahat Kazmi et al., 'Indoor and Outdoor Depth Imaging of Leaves With Time of Flight and stereo vision Sensors: Analysis and Comparison', ISPRS Journal of Photogrammetry and Remote Sensing 88, 2014, pp. 128-146 p. 130.
(Continued)

*Primary Examiner* — Michael Lee
(74) *Attorney, Agent, or Firm* — Cha & Reiter, LLC.

(57) ABSTRACT

In embodiments, an electronic device may include a first camera disposed on one surface of the electronic device, a second camera disposed on the one surface, a depth sensor disposed on the one surface, and a processor configured to: cause the first camera to acquire a first one or more images of an external object, and generate depth information of the external object using a selected one of the first camera and second camera or the depth sensor, the selected one based on color information or texture pattern information corresponding to the external object in the first one or more images.

19 Claims, 7 Drawing Sheets

(51) Int. Cl.
  *G01S 17/89* (2020.01)
  *H04N 13/239* (2018.01)
  *G06T 7/50* (2017.01)
  *H04N 13/00* (2018.01)
(52) U.S. Cl.
  CPC . *H04N 13/254* (2018.05); *G06T 2207/10028* (2013.01); *H04N 2013/0081* (2013.01)
(58) Field of Classification Search
  USPC .......................................................... 348/46
  See application file for complete search history.

(56) References Cited

U.S. PATENT DOCUMENTS

| | | |
|---|---|---|
| 2009/0128833 A1 | 5/2009 | Yahav |
| 2013/0215027 A1* | 8/2013 | Van Lydegraf ....... G06F 3/0416 345/158 |
| 2013/0222550 A1 | 8/2013 | Choi et al. |
| 2015/0146926 A1* | 5/2015 | Ramachandran .. G06K 9/00624 382/103 |
| 2015/0161818 A1* | 6/2015 | Komenczi .............. H04N 13/25 348/43 |
| 2016/0212411 A1* | 7/2016 | Lindner .................... G06T 5/50 |
| 2017/0150067 A1 | 5/2017 | Han |
| 2017/0272651 A1 | 9/2017 | Mathy et al. |
| 2018/0048879 A1 | 2/2018 | Venkataraman et al. |
| 2018/0081043 A1* | 3/2018 | Demirtas ................ H04N 5/247 |
| 2019/0369247 A1* | 12/2019 | Lindner ................ G01S 7/4816 |

FOREIGN PATENT DOCUMENTS

| | | |
|---|---|---|
| KR | 10-1242891 B1 | 3/2013 |
| KR | 10-2017-0091914 A | 8/2017 |

OTHER PUBLICATIONS

International Search Report dated Mar. 6, 2020.

\* cited by examiner

ELECTRONIC DEVICE AND METHOD FOR ACQUIRING DEPTH INFORMATION BY USING AT LEAST ONE OF CAMERAS OR DEPTH SENSOR

CROSS-REFERENCE TO RELATED APPLICATION(S)

This application is based on and claims priority under 35 U.S.C. 119 to Korean Patent Application No. 10-2018-0153883, filed on Dec. 3, 2018, in the Korean Intellectual Property Office, the disclosures of which are herein incorporated by reference in their entireties.

BACKGROUND

Field

The disclosure relates to an electronic device and method for acquiring depth information by using at least one of a plurality of cameras or a depth sensor.

Description of Related Art

In electronic devices, accurate determination of the depth information while optimally consuming power, and avoiding heat generation is important.

The above information is presented as background information only to assist with an understanding of the disclosure. No determination has been made, and no assertion is made, as to whether any of the above might be applicable as prior art with regard to the disclosure.

SUMMARY

According to certain embodiments of the disclosure, an electronic device may include a first camera disposed on one surface of the electronic device, a second camera disposed on the one surface, a depth sensor disposed on the one surface, and a processor configured to: cause the first camera to acquire a first one or more images of an external object, and generate depth information of the external object using a selected one of the first camera and second camera or the depth sensor, the selected one based on color information or texture pattern information corresponding to the external object in the first one or more images.

According to certain embodiments of the disclosure, an electronic device may include a first camera disposed on one surface of the electronic device, a second camera disposed on the one surface, a depth sensor disposed on the one surface, and a processor configured to cause the first camera to acquire a first one or more images of an external object, measuring a selected one of a first depth of the external object using the first camera and the second camera or a second depth of the external object using the depth sensor based on at least one of a color information or texture pattern information, and generate depth information corresponding to the external object by using the selected one of the measured first depth or the measured second depth.

According to certain embodiments of the disclosure, a method for generating depth information in an electronic device may include, by at least one processor, acquiring one or more first images of an external object by using a first camera disposed on one surface of the electronic device; by the at least one processor, determining whether a predetermined condition associated with at least one of color information or texture pattern information of the external object identified from the acquired one or more first images is satisfied; by the at least one processor, when the predetermined condition is satisfied, acquiring one or more second images of the external object by using the first camera, acquiring one or more third images of the external object corresponding to the one or more second images by using a second camera disposed on the one surface, and generating depth information corresponding to the external object based on a comparison between the one or more second images and the one or more third images; and by the at least one processor, when the predetermined condition is not satisfied, measuring a depth of the external object by using a depth sensor disposed on the one surface, and generating the depth information corresponding to the external object based on the measured depth.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

One method for acquiring depth information of a target subject is what is called a time of flight (TOF) scheme in which the electronic device irradiates light onto the subject and acquires the depth information by using the TOF of the light reflected from the subject. Another method is a stereo scheme in which the electronic device analyzes a plurality of images obtained using two or more cameras to acquire the depth information. Still another method is to use structured light and triangulation.

The stereo scheme using two or more cameras may not perform as well in a low illumination environment and/or an outdoor environment. In addition, the TOF scheme may not perform as well when the subject has a large amount of black color or is a very short distance away. An electronic device that uses both schemes together can be complex, use excessive power, and generated excessive heat.

To that end, the certain embodiments of the present disclosure include an electronic device that uses a first camera to acquire a first image(s) of an external object. The electronic device then generates depth information of the external object using either a stereoscopic camera scheme or TOF scheme, based on characteristics of the acquired images of the external object. The stereoscopic camera scheme can include using the first camera to take second image(s) and a second camera to take third image(s). The TOF scheme include using a depth sensor to measure the depth of the external object, using, in certain embodiments, infrared light.

The characteristics of the first image(s) that the electronic device uses to determine whether to use the stereoscopic camera scheme or TOF scheme can include characteristics such as color information (which can include whether the color temperature is less than or equal to 5000 K or darkness level) and texture pattern information (which can include texture variation level and texture variation frequency).

Figure 1:
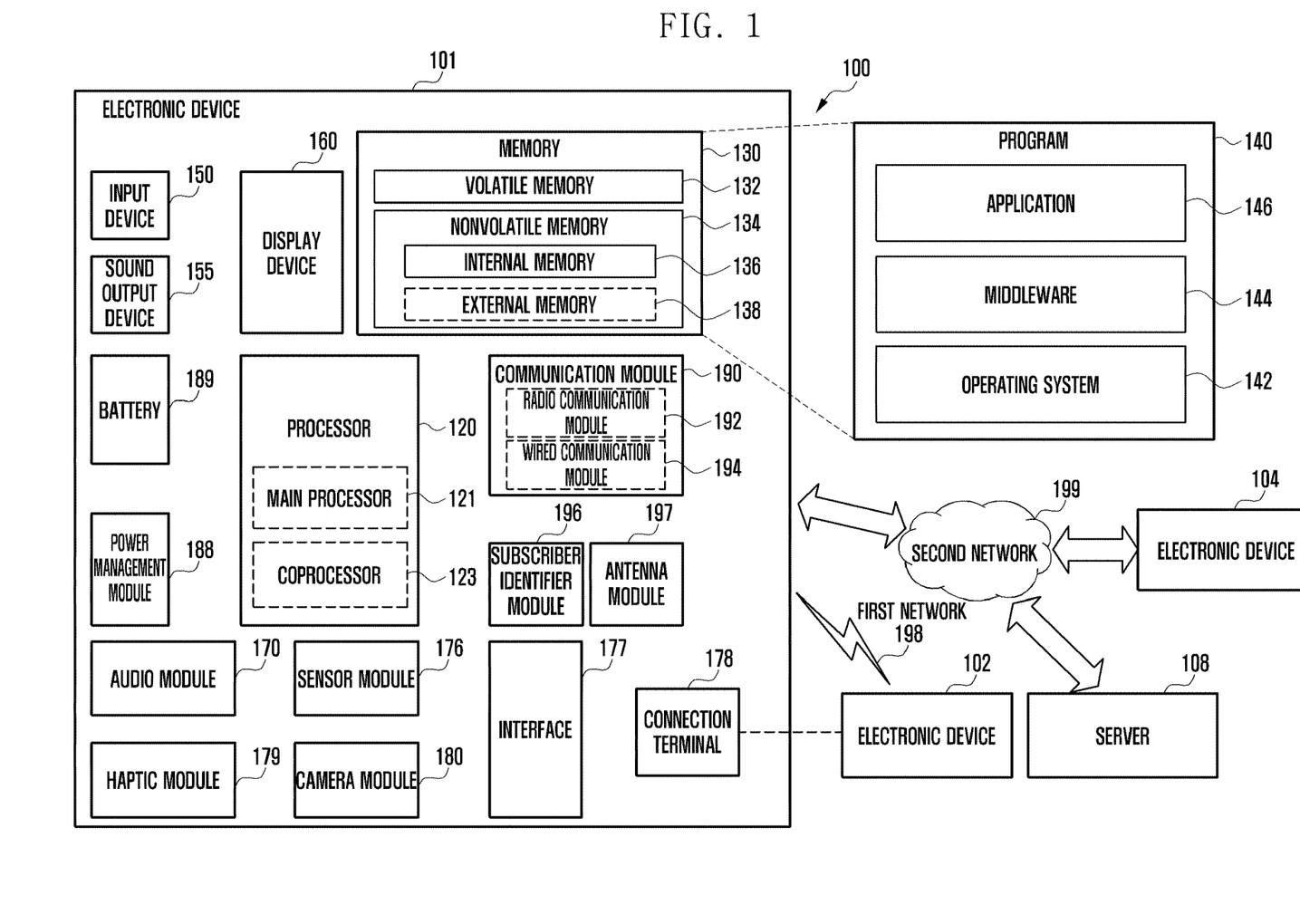
FIG. 1 is a block diagram illustrating an electronic device in a network environment according to certain embodiments.
Figure 2:
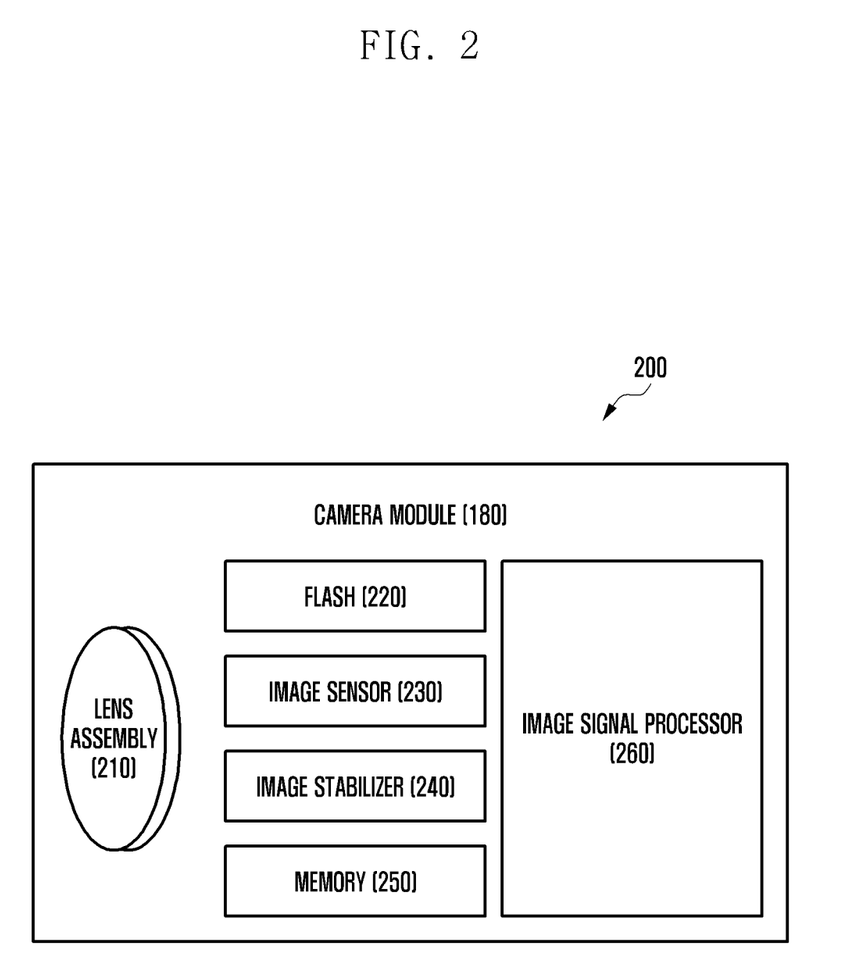
FIG. 2 is a block diagram illustrating a camera module according to certain embodiments.
Figure 3:
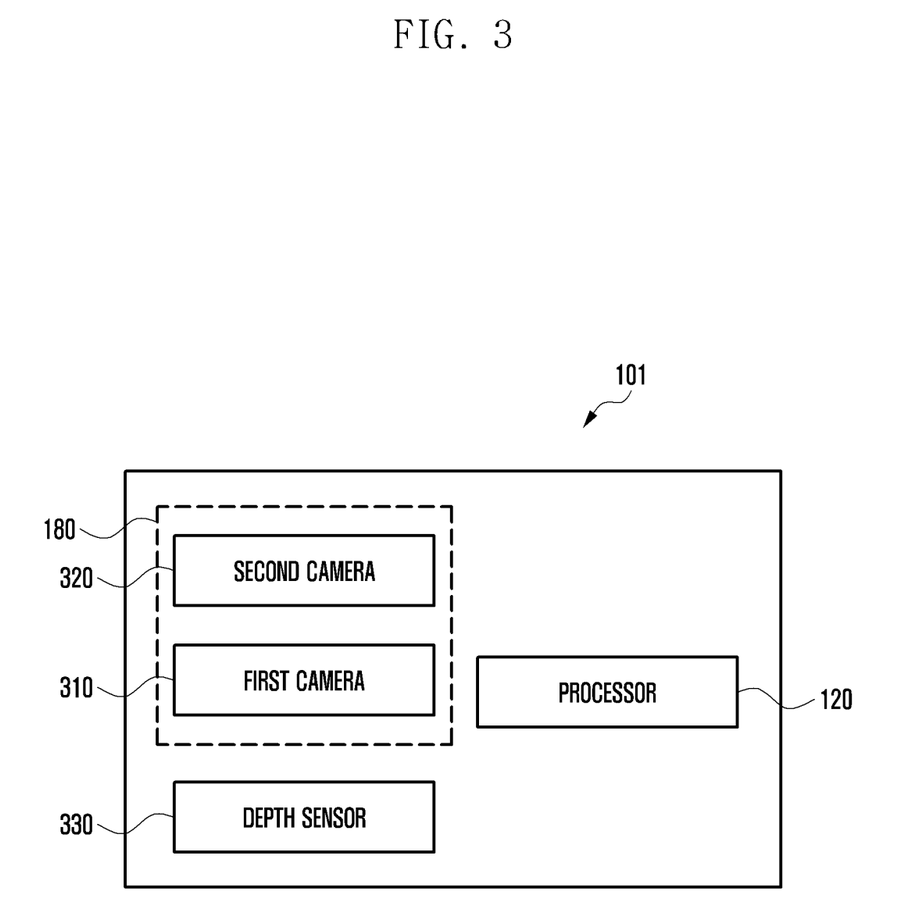
FIG. 3 is a block diagram illustrating a configuration related to depth information generation of an electronic device according to certain embodiments.

Hereinafter, embodiments of the disclosure will be described in detail with reference to accompanying drawings. FIG. 1 is a block diagram of an electronic device that, in accordance with certain embodiments of the present disclosure. FIGS. 2 and 3 are block diagrams of camera modules in accordance with certain embodiments of the present disclosure. FIGS. 4-7 describe a method or operations of a processor(s) in accordance with certain embodiments of the disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The term "processor" shall be understood to refer to the singular context and the plural context, collectively. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

In certain embodiments, in the electronic device 101 the camera module 180 can include a camera module 180 that includes a first camera and a second camera, while the sensor module 176 includes a depth sensor. The electronic device uses a first camera of the camera module 180 to acquire a first image(s) of an external object. The electronic device then generates depth information of the external object using either the first camera and the second camera of the camera module 180 in a stereoscopic camera scheme or a depth sensor in the sensor module 176 in a TOF scheme.

FIG. 2 is a block diagram 200 illustrating the camera module 180 according to certain embodiments. Referring to FIG. 2, the camera module 180 may include a lens assembly 210, a flash 220, an image sensor 230, an image stabilizer 240, memory 250 (e.g., buffer memory), or image signal processor(s) 260 (from hereinafter, image signal processor 260 will collectively refer to the singular and plural context). The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

FIG. 3 is a block diagram illustrating a configuration related to depth information generation of an electronic device 101 according to certain embodiments.

Referring to FIG. 3, the electronic device 101 (e.g., the electronic device 101 in FIG. 1) according to certain embodiments may include at least one processor 120 (e.g., the processor 120 in FIG. 1), a camera module 180, and a depth sensor 330. The camera module 180 may include a first camera 310 and a second camera 320.

For example, the processor 120 may include the image signal processor 260 shown in FIG. 2. The processor 120 (e.g., the image signal processor 260) may, for example, acquire depth information about an external object and, based on the depth information, perform 3-dimensional (3D) modeling of an image, generate a depth map, or perform an image correction.

Using at least one of the first camera 310, the second camera 320, and the depth sensor 330, the processor 120 may generate the depth information about the external object. In certain embodiments, the processor 120 generate depth information of the external object using a selected one of the first camera 310 and second camera 320 or the depth sensor 330, the selected one based on color information or texture pattern information corresponding to the external object in the first one or more images.

For example, the processor 120 may acquire images of the external object by using the first camera 310 and the second camera 320, respectively. Then, using a parallax between the acquired images, the processor 120 may generate the depth information corresponding to the external object.

In another example, the processor 120 may measure a depth of the external object by using the depth sensor 330. Then, using the measured depth, the processor 120 may generate the depth information corresponding to the external object.

According to certain embodiments, based on a status of the electronic device 101 or a state of the external object (e.g., a subject) that becomes a target for the acquisition of the depth information through the electronic device 101, the processor 120 may apply different methods for generating the depth information.

For example, the processor 120 may control the first camera 310 to acquire one or more first images of the external object. Then, depending on a result of analyzing the acquired first image(s), the processor 120 may selectively apply different methods of depth information generation.

For example, depending on whether a predetermined condition is satisfied, the processor 120 may selectively use a method for generating the depth information by using the plurality of cameras 310 and 320 and a method for generating the depth information by using the depth sensor 330. Alternatively, the processor 120 may generate the depth information by using the plurality of cameras 310 and 320 and the depth sensor 330 together.

According to certain embodiments, the first camera 310 may be disposed on one surface of the electronic device 101. In addition, the second camera 320 and the depth sensor 330 may be disposed to be adjacent to the first camera 310 in other regions of the surface on which the first camera 310 is disposed.

Figure 4:
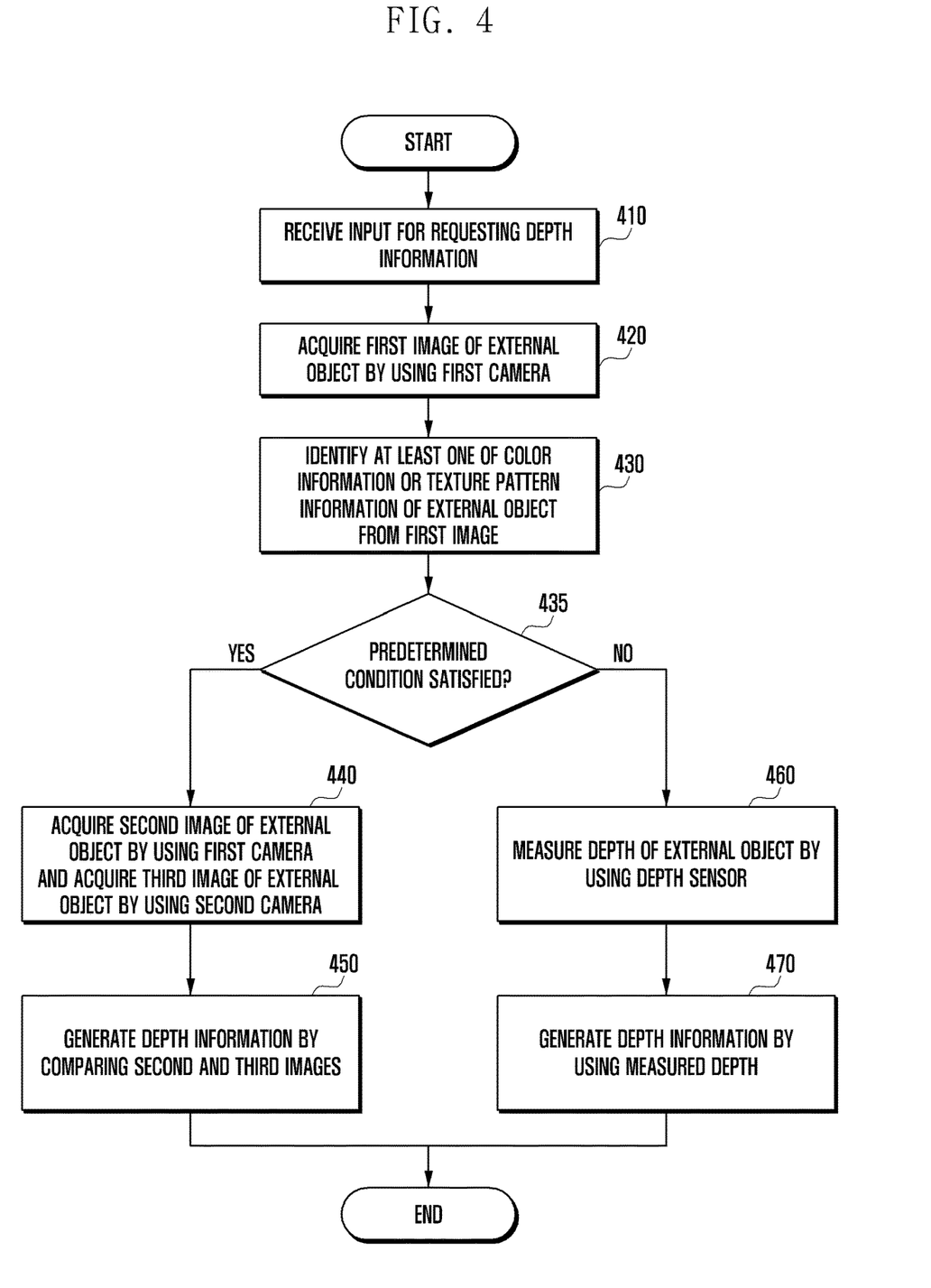
FIG. 4 is a flow diagram illustrating a method for generating depth information in an electronic device according to certain embodiments.

FIG. 4 is a flow diagram illustrating a method for generating depth information in an electronic device 101 according to certain embodiments.

Referring to FIG. 4, at operation 410, the electronic device 101 according to certain embodiments may receive an input for requesting depth information through an input device (e.g., the input device 150 in FIG. 1) thereof. For example, the depth information request input may include a request for capturing a 3D image, a request for an out-of-focus image or an image to which a Bokeh effect is applied, or an authentication request for user face recognition.

At operation 420, the processor 120 according to certain embodiments may acquire one or more first images of an external object by using the first camera 310 in response to receiving the depth information request input at the operation 410.

In one embodiment, the first camera 310 may have been driven before the input for requesting the depth information is received. For example, when the depth information request input is received while a preview image of the external object is displayed through the display (e.g., the display device 150 in FIG. 1), the processor 120 may acquire the first image of the external object corresponding to a time point of receiving the input.

In another embodiment, the first camera 310 may start to be driven just when the input for requesting the depth information is received. For example, when the depth information request input is received, the processor 120 may drive the first camera 310 in response to the received input and control the first camera 310 to acquire the first image of the external object.

At operation 430, according to certain embodiments, the processor 120 may identify at least one of color information or texture pattern information of the external object from the one or more first images acquired at the operation 420. Then, at operation 435, the processor 120 may determine whether the identified information satisfies a predetermined condition.

For example, using at least a part of the acquired one or more first images, the processor 120 may identify color information and/or texture pattern information of the external object and then determine whether a predetermined condition associated with the color information and/or the texture pattern information is satisfied.

The color information of the external object may include, for example, at least one of color temperature information of the external object or color information (or information indicating a darkness level) of the external object.

In one embodiment, the processor 120 may identify the color temperature information of the external object, based on color coordinate information of pixels contained in the one or more first images. Then, based on the identified color temperature information, the processor 120 may determine whether a color temperature of the external object is equal to or smaller than 5000 K. That is, when the color temperature of the external object is equal to or smaller than 5000 K, the processor 120 may determine that the predetermined condition is satisfied.

In another embodiment, the processor 120 may identify the darkness level information of the external object, based on brightness information of pixels contained in the one or more first images. Then, based on the identified darkness level information, the processor 120 may determine whether a darkness level of the external object is equal to or greater than a given (or predetermined; "given" will now be used) threshold level. That is, when the darkness level of the external object is equal to or greater than the threshold level, the processor 120 may determine that the predetermined condition is satisfied.

For example, the processor 120 may obtain a value related to the darkness of the first image and compare the obtained value with a given threshold value. In another example, the processor 120 may obtain a Y value of each pixel in the first image and compare the obtained Y value of each pixel with a given threshold value. In this case, the Y value may refer to a value indicating the darkness of the image by any one of values of 0 to 255 (Greater values are darker). Then, the processor 120 may identify the number or area of pixels each of which has the Y value of a given threshold value or more. If the identified number or area of pixels is equal to or greater than a predetermined ratio compared to the number or area of all pixels of the first image, the processor 120 may determine that the predetermined condition is satisfied.

Additionally or alternatively, the processor 120 may identify the texture pattern information of the external object by filtering the first image through a corner and/or edge detection technique. For example, the processor 120 may identify the number or area of pixels in the filtered image. If the identified number or area of pixels is equal to or greater than a predetermined ratio compared to the number or area of all pixels of the first image, the processor 120 may determine that the predetermined condition is satisfied.

The texture pattern information of the external object may include, for example, at least one of texture variation level information of the external object or texture variation frequency information of the external object.

In certain embodiments, texture pattern information can be obtained from JPEG compression information where the image is converted from the spatial domain to the frequency domain and examining the magnitude of coefficients of the higher magnitude frequencies.

In one embodiment, the processor 120 may identify the texture variation level information (e.g., information indicating a depth difference between adjacent pixels) of the external object, based on pixel information (e.g., color coordinate information) in the one or more first images. Then, based on the identified texture variation level information, the processor 120 may determine whether a texture variation level (e.g., a difference in depth) of the external object is equal to or greater than a given threshold value. If so, the processor 120 may determine that the predetermined condition is satisfied.

In another embodiment, the processor 120 may identify the texture variation frequency information of the external object, based on the pixel information in the one or more first images. For example, the texture variation frequency information of the external object may indicate a frequency of pixels having a depth difference of a given value or more between adjacent pixels within a certain area range. Then, based on the identified texture variation frequency information, the processor 120 may determine whether a texture variation frequency of the external object is equal to or smaller than a given threshold value. If so, the processor 120 may determine that the predetermined condition is satisfied.

At the operation 435, the processor 120 may determine whether at least one of the color temperature of the external object, the darkness level of the external object, the texture variation level of the external object, and the texture variation frequency of the external object satisfies a corresponding predetermined condition. Alternatively, the processor 120 may determine whether all of them satisfy corresponding predetermined conditions.

Meanwhile, the processor 120 may acquire illuminance information of the external object by using the first camera and further determine whether the acquired illuminance information satisfies a related illuminance condition.

That is, when at least one (or all) of the color temperature of the external object, the darkness level of the external object, the texture variation level of the external object, and the texture variation frequency of the external object satisfies a corresponding predetermined condition, and also when the illuminance information of the external object satisfies a related illuminance condition, the processor 120 may determine that the predetermined condition is satisfied.

When it is determined at the operation 435 that the predetermined condition is satisfied, the processor 120 may perform operation 440.

At the operation 440, the processor 120 may use the first and second cameras 310 and 320. Specifically, the processor 120 may acquire one or more second images of the external object by using the first camera 310 and also acquire one or more third images of the external object by using the second camera 320. The one or more third images may correspond to the one or more second images. For example, the second image(s) and the third image(s) may be acquired at the same time point.

At operation 450, the processor 120 may compare the acquired one or more second images with the acquired one or more third images and, based on the comparison result, generate the depth information corresponding to the external object.

According to certain embodiments, the first camera 310 and the second camera 320 may have different optical characteristics. Specifically, the first camera 310 may include a first lens group having a first focal length and a first angle of view, and a first image sensor. For example, the first lens group may include a standard view angle lens or a telephoto angle lens. In addition, the second camera 320 may include a second lens group having a second focal length and a second angle of view, and a second image sensor. The second focal length may be smaller than the first focal length, and the second angle of view may be greater than the first angle of view. For example, the second lens group may include a wide angle lens. According to an embodiment, one of the first and second cameras 310 and 320 may be defined as a main camera, and the other may be defined as a sub camera.

When it is determined at the operation 435 that the predetermined condition is not satisfied, the processor 120 may perform operation 460.

At the operation 460, the processor 120 may use the depth sensor 330 to measure the depth of the external object.

For example, the processor 120 may output light toward the external object by using a light emitter of the electronic device 101 that is functionally connected to the processor 120. For example, the outputted light may contain, at least in part, light of the infrared wavelength range. The light outputted from the light emitter may be reflected by the external object and then be at least partially incident on the depth sensor 330 of the electronic devices 101. Thus, using the depth sensor 330, the processor 120 may detect at least part of the light reflected by the external object and, based on the detection result, measure the depth of the external object.

At operation 470, the processor 120 may generate the depth information corresponding to the external object by using the depth measured at the operation 460. For example, the processor 120 may compare information about the light outputted through the light emitter with information about the light detected using the depth sensor 330 and thereby generate the depth information corresponding to an external object.

It is noted that in FIG. 4, use of a stereoscopic camera scheme (first camera 310 and second camera 320) or a TOF scheme (depth sensor 330) are mutually exclusive. In certain embodiments, separate determinations using different conditions can be made to whether to use the stereoscopic camera scheme (first camera 310 and second camera 320) and the TOF scheme (depth sensor 330).

Figure 5:
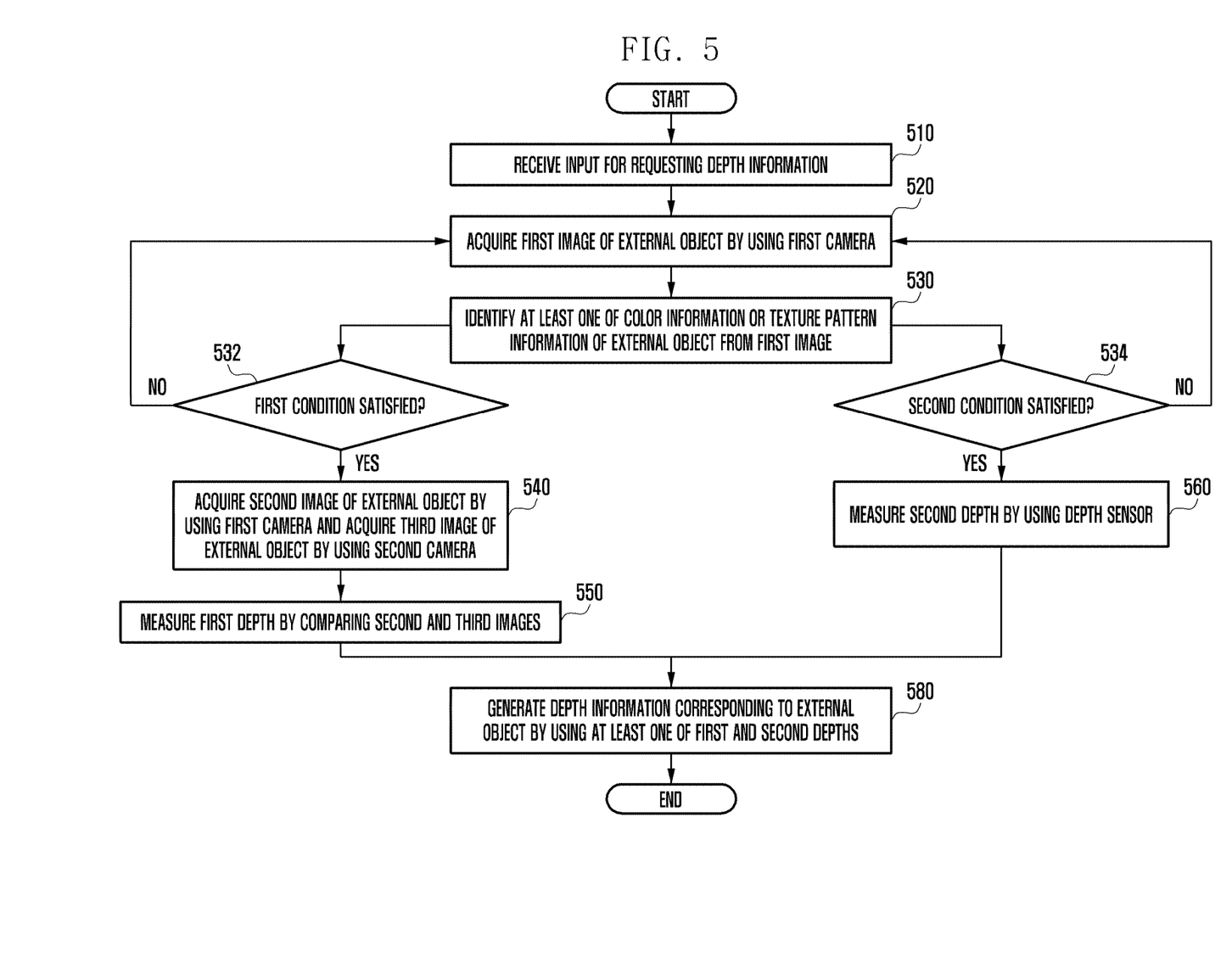
FIG. 5 is a flow diagram illustrating a depth information generation method of an electronic device according to certain embodiments.

FIG. 5 is a flow diagram illustrating a depth information generation method of an electronic device 101 according to certain embodiments.

Operations 510 to 530 of FIG. 5 may correspond to the above-described operations 410 to 430 of FIG. 4, respectively, so only simple descriptions thereof will be given hereinafter.

Referring to FIG. 5, at operation 510, the electronic device 101 according to certain embodiments may receive an input for requesting depth information through an input device thereof.

At operation 520, the processor 120 according to certain embodiments may control the first camera 310 to acquire one or more first images of an external object.

At operation 530, according to certain embodiments, the processor 120 may identify at least one of color information or texture pattern information of the external object from the acquired one or more first images. As described above, the color information of the external object may include, for example, color temperature information of the external object and/or color information (or information indicating a darkness level) of the external object. In addition, the texture pattern information of the external object may include, for example, texture variation level information of the external object and/or texture variation frequency information of the external object.

Although it is described in this disclosure that the first image acquired through the first camera 310 is used, an image acquired through the second camera 320 may be used alternatively.

At operation 532, the processor 120 may determine whether at least one of the identified color information of the external object or the identified texture pattern information of the external object satisfies a predetermined first condition.

For example, the predetermined first condition may include at least one condition associated with at least one of a color temperature of the external object, a darkness level of the external object, a texture variation level (e.g., a depth difference between adjacent pixels) of the external object, or a texture variation frequency (e.g., a frequency of pixels having a depth difference of a given value or more between adjacent pixels within a certain area range) of the external object.

In one example, the first condition may indicate whether the color temperature of the external object is equal to or smaller than 5000 K. In another example, the first condition may indicate whether the darkness level of the external object is equal to or greater than a first threshold value. In still another example, the first condition may indicate whether the texture variation level of the external object is equal to or greater than a second threshold value. In yet another example, the first condition may indicate whether the texture variation frequency of the external object is equal to or smaller than a third threshold value.

When it is determined at the operation 532 that the predetermined first condition is satisfied, the processor 120 may perform operation 540. At the operation 540, the processor 120 may acquire one or more second images and one or more third images of the external object by using the first and second cameras 310 and 320. The one or more third images may correspond to the one or more second images.

At operation 550, the processor 120 may compare the acquired one or more second images with the acquired one or more third images and, based on the comparison result, measure a first depth of the external object.

At operation 534, the processor 120 may determine whether at least one of the identified color information of the external object or the identified texture pattern information of the external object satisfies a predetermined second condition.

For example, the predetermined second condition may include at least one condition associated with at least one of the color temperature of the external object, the darkness level of the external object, the texture variation level of the external object, or the texture variation frequency of the external object.

In one example, the second condition may indicate whether the color temperature of the external object is greater than 5000 K. In another example, the second condition may indicate whether the darkness level of the external object is smaller than the first threshold value. In still another example, the second condition may indicate whether the texture variation level of the external object is smaller than the second threshold value. In yet another example, the second condition may indicate whether the texture variation frequency of the external object is greater than the third threshold value.

When it is determined at the operation 534 that the predetermined second condition is satisfied, the processor 120 may perform operation 560. At the operation 560, the processor 120 may measure a second depth of the external object by using the depth sensor 330. For example, the processor 120 may control a light emitter to output light containing at least partially light of the infrared wavelength range, control the depth sensor 330 to detect at least part of the light reflected by the external object, and measure the second depth of the external object, based on information about the outputted light and information about the detected light.

According to certain embodiments, when neither the first condition nor the second condition are satisfied, the processor 120 may not measure the first and second depths. For example, if it is determined that all of the first and second conditions are not satisfied, the processor 120 may generate a related user notification to instruct the user to change a depth measurement environment. In addition, when both the first and second conditions are satisfied, the processor 120 may measure both the first and second depths. Also, when only one of the first and second conditions is satisfied, the processor 120 may measure only one of the first and second depths.

At operation 580, the processor 120 may generate depth information corresponding to the external object by using one or both of the first depth measured at the operation 550 and the second depth measured at the operation 560.

That is, the processor 120 may generate the depth information corresponding to the external object, based on the first depth measured using the first and second cameras 310 and 320, and/or generate the depth information corresponding to the external object, based on the second depth measured using the depth sensor 330.

According to an embodiment, based on whether at least some of the first and second conditions are satisfied, the processor 120 may determine whether to generate the depth information by using one or both of the first and second depths.

According to an embodiment, based on whether at least some of the first and second conditions are satisfied, the processor 120 may generate the depth information by using both of the first and second depths. In this case, the processor 120 may synthesize information about the first depth and information about the second depth and thereby generate the depth information corresponding to the external object.

Figure 6:
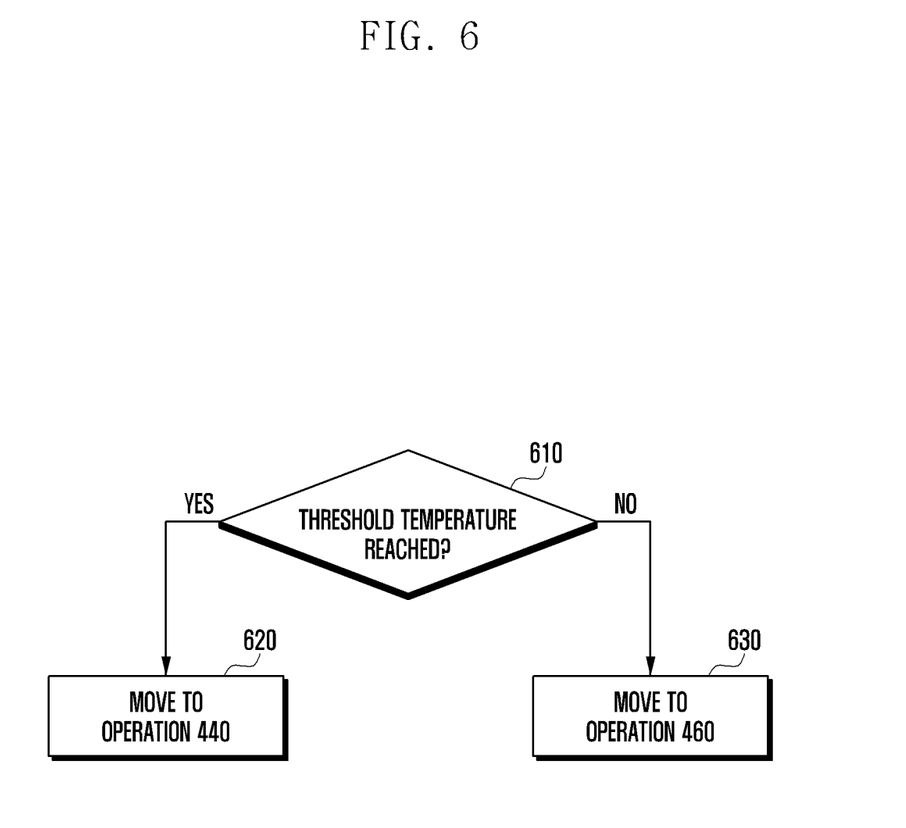
FIG. 6 is a flow diagram illustrating a depth information generation method according to certain embodiments.

FIG. 6 is a flow diagram illustrating a depth information generation method according to certain embodiments.

Referring to FIG. 6, at operation 610, the processor 120 according to certain embodiments may check a heating state of the electronic device 101. That is, the processor 120 may periodically check the heating state of the electronic device 101 and thereby determine whether the electronic device 101 reaches a threshold temperature. Then, based on the heating state of the electronic device 101, the processor 120 may determine a depth information generation method.

When it is determined at the operation 610 that the electronic device 101 reaches the threshold temperature, the processor 120 may move, at operation 620, to the above-described operation 440 of FIG. 4. That is, when the electronic device 101 has the threshold temperature or more, the processor 120 may acquire the second and third images by using the first and second cameras 310 and 320 and then generate the depth information by comparing the second and third images.

When it is determined at the operation 610 that the electronic device 101 does not reach the threshold temperature, the processor 120 may move, at operation 630, to the above-described operation 460 of FIG. 4. That is, when the electronic device 101 has a temperature less than the threshold temperature, the processor 120 may measure the depth of the external object by using the depth sensor 330 and then generate the depth information.

According to an embodiment, the operation 610 may be performed after the above-described operation 435 of FIG. 4. For example, if it is determined at the operation 435 that the predetermined condition is not satisfied, the processor 120 may check the heating state of the electronic device 101 at the operation 610. Then, if it is determined at the operation 610 that the electronic device 101 reaches the threshold temperature, the processor 120 may perform the operation 440 instead of the operation 460.

According to another embodiment, the operation 610 may be performed after the above-described operation 534 of FIG. 5. For example, if it is determined at the operation 534 that the second condition is satisfied, the processor 120 may check the heating state of the electronic device 101 at the operation 610. Then, if it is determined at the operation 610 that the electronic device 101 reaches the threshold temperature, the processor 120 may perform the operation 540 instead of the operation 560.

According to still another embodiment, if it is determined at the operation 435 that the predetermined condition is not satisfied, and if it is determined at the operation 610 that the electronic device 101 reaches the threshold temperature, the processor 120 may not perform the operation 440, but generate a user notification to instruct the user to change a depth measurement environment. Then, the processor 120 may perform the operation 420.

Figure 7:
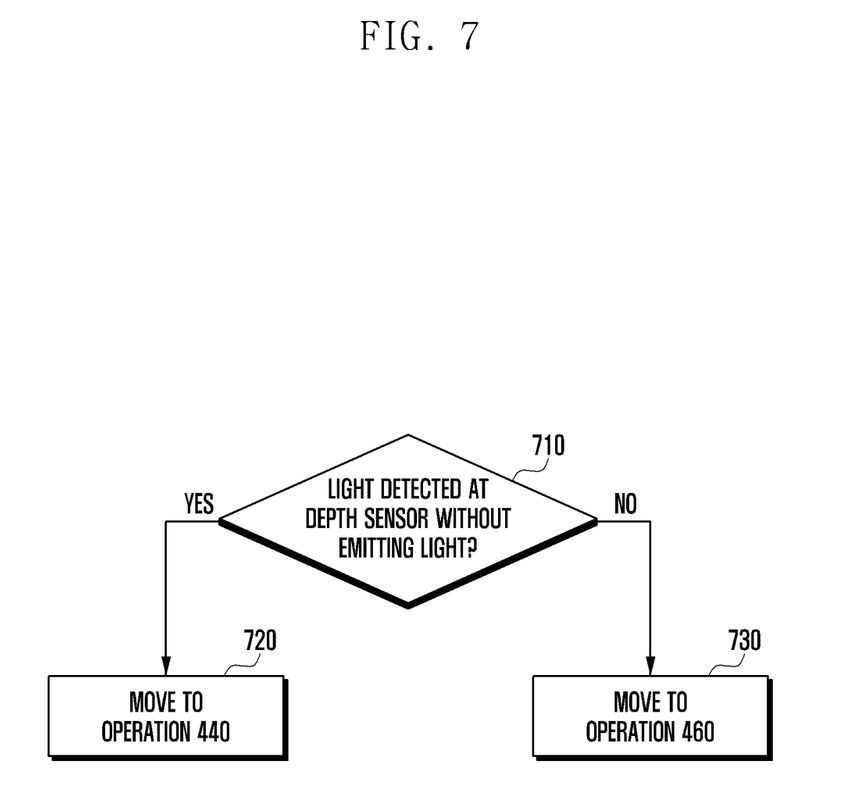
FIG. 7 is a flow diagram illustrating a depth information generation method according to certain embodiments.

FIG. 7 is a flow diagram illustrating a depth information generation method according to certain embodiments.

Referring to FIG. 7, at operation 710, the processor 120 may determine whether the depth sensor detects light. Specifically, in a state where the light emitter does not output light toward the external object, the processor 120 may determine whether the depth sensor detects light reflected by the external object.

That is, if any light reflected by the external object is detected by the depth sensor even though the light emitter does not output the light toward the external object, the processor 120 may regard the detected light as occurring because of an external environmental factor.

In some embodiments, the processor 120 may perform the operation 710 when it is determined at the operation 435 of FIG. 4 the predetermined condition is not satisfied or when it is determined at the operation 534 of FIG. 5 that the second condition is satisfied. When the light is detected from the depth sensor without emitting light to the external object at the operation 710, the processor 120 may perform the above-described operation 440 instead of performing the above-described operation 460.

In another embodiment, when it is determined at the operation 435 of FIG. 4 the predetermined condition is not satisfied, and when the light is detected from the depth sensor without emitting light to the external object at the operation 710, the processor 120 may perform neither the operation 460 nor the operation 440. Instead, the processor 120 may generate a user notification indicating a failure in generating the depth information, display the user notification on the display, and induce the user to change a depth measurement environment.

As described hereinbefore, the electronic device according to the disclosure can automatically apply an optimal depth information generation method in consideration of an external environment. Accordingly, the electronic device can reduce power consumption and also acquire high-quality depth information without bearing excessive burden.

While the disclosure has been particularly shown and described with reference to exemplary embodiments thereof, it will be understood by those skilled in the art that various changes in form and details may be made therein without departing from the scope of the subject matter as defined by the appended claims.

What is claimed is:

1. An electronic device comprising:
a first camera disposed on one surface of the electronic device;
a second camera disposed on the one surface;
a depth sensor disposed on the one surface configured to sense depth based on a Time of Flight Scheme; and
a processor configured to:
cause the first camera to acquire a first one or more images of an external object, and
generate depth information of the external object using a selected one of the first camera and second camera or the depth sensor, the selected one based on color information or texture pattern information corresponding to the external object in the first one or more images, and
determine whether the depth sensor detects light corresponding to a specific wavelength band by a specific intensity or more,
wherein the generating depth information of the external object is conducted using the first camera and the second camera based on the determination.

2. The electronic device of claim 1, wherein generate the depth information of the external object comprises:
when a predetermined condition associated with at least one of the color information or the texture pattern information is satisfied:
acquire a second one or more images of the external object by using the first camera;
acquire a third one or more images of the external object by using the second camera; and
generate depth information corresponding to the external objected based on a comparison between the second one or more images and the third one or more images; and
when the predetermined condition is not satisfied:
measure a depth of the external object by using the depth sensor; and
generate the depth information corresponding to the external object based on the measured depth.

3. The electronic device of claim 2, wherein in order to determine whether the predetermined condition is satisfied, the processor is further configured to determine:
whether the electronic device reaches a threshold temperature.

4. The electronic device of claim 2, wherein in order to determine whether the predetermined condition is satisfied, the processor is further configured to determine:
whether illuminance information of the external object acquired using the first camera satisfies a related illuminance condition.

5. The electronic device of claim 1, wherein the processor is further configured to:
output light toward the external object by using a light emitter functionally connected to the processor, wherein the outputted light contains, at least in part, infrared light, and
measure the depth of the external object, based on at least part of the light reflected by the external object and detected by the depth sensor.

6. The electronic device of claim 1, wherein the color information comprises at least one of:
whether a color temperature of the external object is above or below a predetermined threshold, or
whether a darkness level of the external object is equal to or greater than a predetermined threshold level;
and wherein the processor is further configured to:
select the first camera and the second camera when the color temperature of the external object is lower than the predetermined threshold; and
select the depth sensor when the color temperature of the external object is above the predetermined threshold.

7. The electronic device of claim 1, wherein the texture pattern information comprises at least one of:
whether a texture variation level of the external object is equal to or greater than a first threshold value, or
whether a texture variation frequency of the external object is equal to or smaller than a second threshold value.

8. The electronic device of claim 1, wherein the first camera and the second camera have different optical characteristics.

9. An electronic device comprising:
a first camera disposed on one surface of the electronic device;
a second camera disposed on the one surface;
a depth sensor disposed on the one surface, configured to sense depth based on a Time of Flight Scheme; and
a processor configured to:
cause the first camera to acquire a first one or more images of an external object,
measuring a selected one of a first depth of the external object using the first camera and the second camera or a second depth of the external object using the depth sensor based on at least one of a color information or texture pattern information, and generate depth information corresponding to the external object by using the selected one of the measured first depth or the measured second depth, determine whether the depth sensor detects light corresponding to a specific wavelength band by a specific intensity or more, wherein the generating depth information of the external object is conducted using the first camera and the second camera based on the determination.

10. The electronic device of claim 9, wherein the processor is further configured to:

output light toward the external object by using a light emitter functionally connected to the processor, wherein the outputted light contains, at least in part, infrared light, and measure the second depth of the external object, based on at least part of the light reflected by the external object and detected by the depth sensor.

11. The electronic device of claim 9, wherein the color information comprises at least one of:

whether a color temperature of the external object is equal to or smaller than 5000 K, or whether a darkness level of the external object is equal to or greater than a predetermined threshold level;

and wherein the processor is further configured to:

select the first camera when the second camera when the darkness level of the external object is equal or greater than the predetermined threshold; and select the depth sensor when the darkness level of the external object is less than the predetermined threshold.

12. The electronic device of claim 9, wherein the texture pattern information comprises at least one of:

whether a texture variation level of the external object is equal to or greater than a first threshold value, or whether a texture variation frequency of the external object is equal to or smaller than a second threshold value.

13. The electronic device of claim 9, wherein measuring the selected one of the first depth of the external object and the second depth of the external object comprises:

determine whether a predetermined condition associated with at least one of color information or texture pattern information of the external object identified from the acquired first one or more images is satisfied, when the predetermined condition is satisfied:

acquire a second one or more images of the external object by using the first camera, acquire a third one or more images of the external object corresponding to the second one or more images by using the second camera, and measure the first depth of the external object based on a comparison between the second one or more images and the third one or more images, and when the predetermined condition is not satisfied, measure the second depth of the external object by using the depth sensor.

14. The electronic device of claim 13, wherein in order to determine whether the predetermined condition is satisfied, the processor is further configured to determine:

whether the electronic device reaches a threshold temperature.

15. The electronic device of claim 13, wherein in order to determine whether the predetermined condition is satisfied, the processor is further configured to determine:

whether the depth sensor detects light corresponding to a specific wavelength band by a specific intensity or more.

16. The electronic device of claim 13, wherein in order to determine whether the predetermined condition is satisfied, the processor is further configured to determine:

whether illuminance information of the external object acquired using the first image satisfies a related illuminance condition.

17. The electronic device of claim 9, wherein the first camera and the second camera have different optical characteristics.

18. A method for generating depth information in an electronic device, the method comprising:

by at least one processor, acquiring one or more first images of an external object by using a first camera disposed on one surface of the electronic device;

by the at least one processor, determining whether a predetermined condition associated with at least one of color information or texture pattern information of the external object identified from the acquired one or more first images is satisfied;

by the at least one processor, when the predetermined condition is satisfied, acquiring one or more second images of the external object by using the first camera, acquiring one or more third images of the external object corresponding to the one or more second images by using a second camera disposed on the one surface, and generating depth information corresponding to the external object based on a comparison between the one or more second images and the one or more third images; and by the at least one processor, when the predetermined condition is not satisfied, measuring a depth of the external object by using a depth sensor disposed on the one surface, wherein the depth sensor measures the depth of the external object using a Time of Flight scheme, and generating the depth information corresponding to the external object based on the measured depth, by the at least one processor, generating depth information of the external object is conducted using the first camera and the second camera according to determining whether the depth sensor detects light corresponding to a specific wavelength band by a specific intensity or more, based on the determination.

19. The method of claim 18, wherein the measuring a depth of the external object includes:

outputting light toward the external object by using a light emitter disposed on the one surface, wherein the outputted light contains, at least in part, light of an infrared wavelength range, detecting, by using the depth sensor, at least part of the light reflected by the external object, and measuring the depth of the external object, based on the detecting.

* * * * *